(12) United States Patent
Bertone et al.

(10) Patent No.: US 8,249,076 B1
(45) Date of Patent: Aug. 21, 2012

(54) METHOD, SYSTEM AND ARCHITECTURE FOR VALIDATING MEDIA SESSIONS IN NETWORKS THAT USE COMMUNICATION PROTOCOLS WITH DISTINCT SIGNALING AND MEDIA CHANNELS

(75) Inventors: Kurt R. Bertone, Hollis, NH (US); Kenneth A. Kuenzel, Sudbury, MA (US); Alexander R. McKinney, Maynard, MA (US)

(73) Assignee: Acme Packet, Inc., Bedford, MA (US)

( * ) Notice: Subject to any disclaimer, the term of this patent is extended or adjusted under 35 U.S.C. 154(b) by 1812 days.

(21) Appl. No.: 10/905,647

(22) Filed: Jan. 14, 2005

(51) Int. Cl.
*H04L 12/28* (2006.01)
(52) U.S. Cl. .................................................. 370/395.2
(58) Field of Classification Search .................. 370/401, 370/469
See application file for complete search history.

(56) References Cited

U.S. PATENT DOCUMENTS

| | | | |
|---|---|---|---|
| 6,735,621 B1* | 5/2004 | Yoakum et al. ............... 709/218 |
| 2002/0181424 A1 | 12/2002 | Shaheen et al. |
| 2004/0013112 A1* | 1/2004 | Goldberg et al. ............. 370/389 |
| 2004/0131042 A1* | 7/2004 | Lillie et al. ................... 370/351 |
| 2005/0060368 A1* | 3/2005 | Wang et al. ................... 709/204 |
| 2005/0083912 A1* | 4/2005 | Afshar et al. ................. 370/352 |
| 2005/0160152 A1* | 7/2005 | Selin et al. .................... 709/217 |
| 2006/0045068 A1* | 3/2006 | Wu et al. ....................... 370/352 |
| 2006/0045121 A1* | 3/2006 | Monk ............................ 370/461 |

OTHER PUBLICATIONS

Handley et al, "SDP: Session Description Protocol", Internet Request for Comment (RFC) 2327, Apr. 1998.
Rosenberg et al, "SIP: Session Initiation Protocol", Internet Request for Comment (RFC) 3261, Jun. 2002.
Rosenberg et al., "An Offer/Answer Model With the Session Description Protocol (SDP)", Internet Request for Comment (RFC) 3264, Jun. 2002.

* cited by examiner

*Primary Examiner* — Otis L Thompson, Jr.
(74) *Attorney, Agent, or Firm* — Thomas, Kayden, Horstemeyer & Risley, LLP

(57) ABSTRACT

Methods for use in operation with a signaling path between given entities are disclosed. One such method includes: deriving, from signaling messages between the given entities, a negotiated set of attributes of an expected media session between the given entities; inferring, from the signaling messages and from semantics of another protocol underlying a session initial protocol, an inferred set of one or more non-negotiated attributes of the expected media session; during an actual media session negotiated by the given entities, determining whether the negotiated set and the inferred set of one or more non-negotiated attributes correspond to given attributes of the actual media session; and taking an administratively-defined action if the negotiated set and the inferred set of one or more non-negotiated attributes do not correspond to given attributes of the actual media session.

13 Claims, 8 Drawing Sheets

**Figure 1
PRIOR ART**
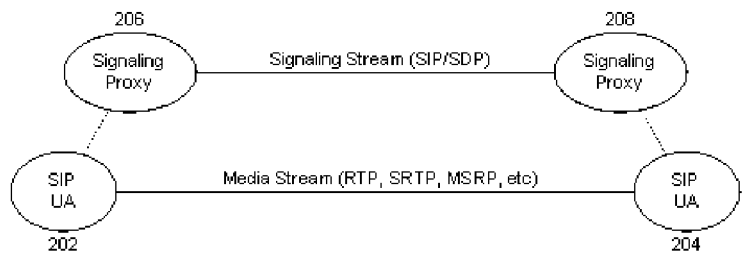
**Figure 2
PRIOR ART**
```
[1]  v=0
[2]  o=461792 8000 8000 IN IP4 192.168.215.210
[3]  s=SIP Call
[4]  c=IN IP4 192.168.215.210
[5]  t=0 0
[6]  m=audio 5004 RTP/AVP 8 0 4 15
```
Figure 3

| Payload Type | Encoding Name | Media Type | Clock Rate | Audio Channels |
|---|---|---|---|---|
| 0 | PCMU | A | 8000 | 1 |
| 1 | Reserved | | | |
| 2 | Reserved | | | |
| 3 | GSM | A | 8000 | 1 |
| 4 | G723 | A | 8000 | 1 |
| 5 | DVI4 | A | 8000 | 1 |
| 6 | DVI4 | A | 16000 | 1 |
| 7 | LPC | A | 8000 | 1 |
| 8 | PCMA | A | 8000 | 1 |
| 9 | G722 | A | 8000 | 1 |
| 10 | L16 | A | 44100 | 2 |
| 11 | L16 | A | 44100 | 1 |
| 12 | QCELP | A | 8000 | 1 |
| 13 | CN | A | 8000 | 1 |
| 14 | MPA | A | 90000 | * |
| 15 | G728 | A | 8000 | 1 |
| 16 | DVI4 | A | 11025 | 1 |
| 17 | DVI4 | A | 22050 | 1 |
| 18 | G729 | A | 8000 | 1 |
| 19 | reserved | A | | |
| 20 | unassigned | A | | |
| 21 | unassigned | A | | |
| 22 | unassigned | A | | |
| 23 | unassigned | A | | |
| 24 | unassigned | V | | |
| 25 | CelB | V | 90000 | * |
| 26 | JPEG | V | 90000 | * |
| 27 | unassigned | V | | |
| 28 | nv | V | 90000 | * |
| 29 | unassigned | V | | |
| 30 | unassigned | V | | |
| 31 | H261 | V | 90000 | * |
| 32 | MPV | V | 90000 | * |
| 33 | MP2T | AV | 90000 | * |
| 34 | H263 | V | 90000 | * |
| 35--71 | unassigned | ? | | |
| 72--76 | reserved | * | | |
| 77--95 | unassigned | ? | | |
| 96—127 | dynamic | ? | | |

* Consult applicable Request for Comments (RFC) for additional information

Figure 4

```
[1]  v=0
[2]  o=461792 8000 8000 IN IP4 192.168.215.210
[3]  s=SIP Call
[4]  c=IN IP4 192.168.215.210
[5]  t=0 0
[6]  m=audio 5004 RTP/AVP 96 97 98
[7]  a=rtpmap:96 G726-16/8000/1
[8]  a=rtpmap:97 G726-24/8000/1
[9]  a=rtpmap:98 G729D/8000/1
```

```
[1]   INVITE sip:192.168.215.220 SIP/2.0
[2]   Via: SIP/2.0/UDP 192.168.215.210;branch=z9hG4bK776asdhds
[3]   From: <sip:461792@192.168.215.210>;tag=1928301774
[4]   To: <sip:192.168.215.220>
[5]   Contact: <sip:461792@192.168.215.210>
[6]   Call-ID: 08a64b48d7c1c492@192.168.215.210
[7]   CSeq: 31186 INVITE
[8]   User-Agent: Generic SIP
[9]   Max-Forwards: 70
[10]  Allow: INVITE,ACK,CANCEL,BYE
[11]  Content-Type: application/sdp
[12]  Content-Length: 240
[13]
[14]  v=0
[15]  o=461792 8000 8000 IN IP4 192.168.215.210
[16]  s=SIP Call
[17]  c=IN IP4 192.168.215.210
[18]  t=0 0
[19]  m=audio 5004 RTP/AVP 8 0 4 15 2
[20]  a=rtpmap:8 PCMA/8000
[21]  a=rtpmap:0 PCMU/8000
[22]  a=rtpmap:4 G723/8000
[23]  a=rtpmap:15 G728/8000
[24]  a=rtpmap:2 G726-32/8000
```

Figure 7

```
[1]   SIP/2.0 200 OK
[2]   Via: SIP/2.0/UDP 192.168.215.210;branch=z9hG4bK776asdhds
[3]   From: <sip:461792@192.168.215.210>;tag=1928301774
[4]   To: <sip:192.168.215.220>;tag=7b9253363dbf0f51
[5]   Call-ID: 08a64b48d7c1c492@192.168.215.210
[6]   CSeq: 31186 INVITE
[7]   User-Agent: Generic SIP
[8]   Contact: <sip:461793@192.168.215.220>
[9]   Allow: INVITE,ACK,CANCEL,BYE
[10]  Content-Type: application/sdp
[11]  Content-Length: 139
[12]
[13]  v=0
[14]  o=461793 8000 8000 IN IP4 192.168.215.220
[15]  s=SIP Call
[16]  c=IN IP4 192.168.215.220
[17]  t=0 0
[18]  m=audio 5004 RTP/AVP 8
[19]  a=rtpmap:8 PCMA/8000
```

Figure 8

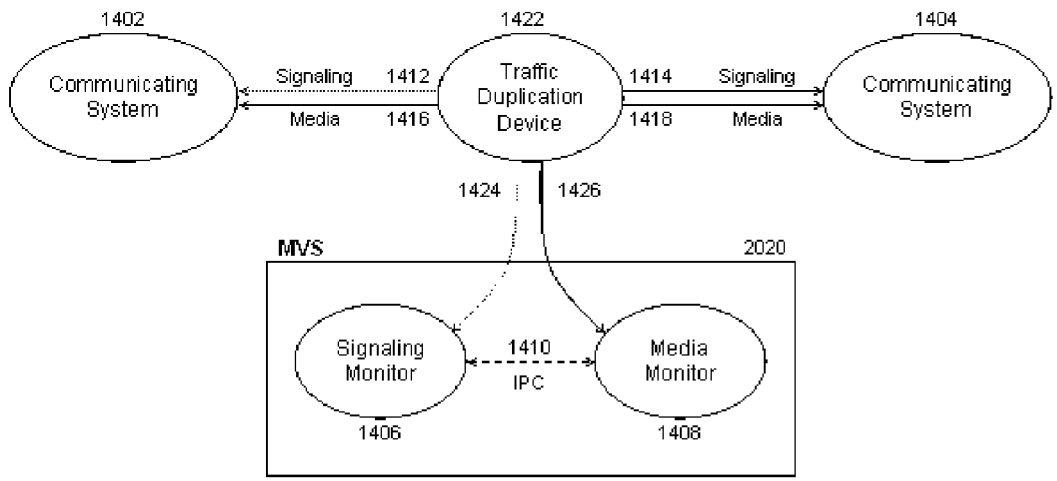
Figure 14
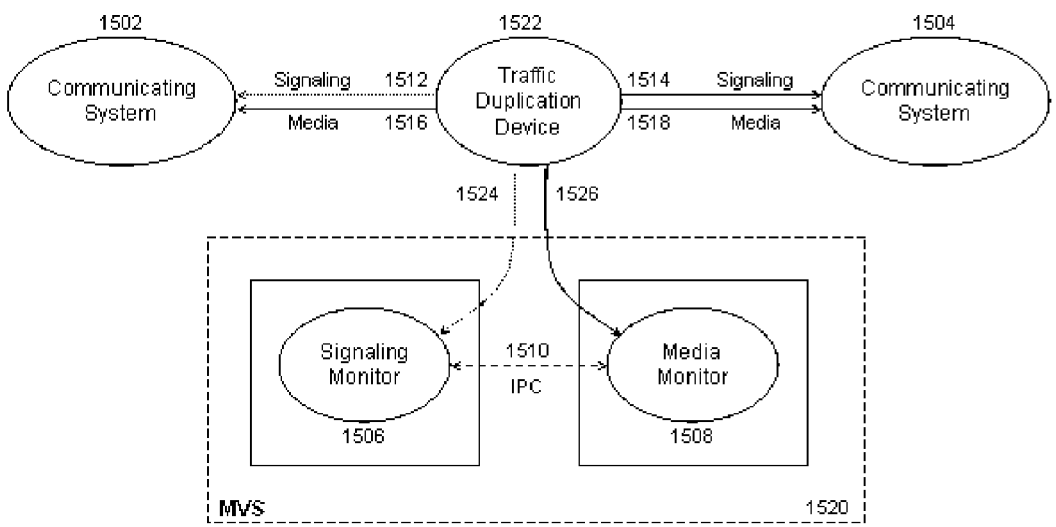
Figure 15
```
[1]   v=0
[2]   o=461792 8000 8000 IN IP4 192.168.215.210
[3]   s=SIP Call
[4]   c=IN IP4 192.168.215.210
[5]   t=0 0
[6]   m=audio 5004 RTP/AVP 8 0 4
[7]   a=rtpmap:8 PCMA/8000
[8]   a=rtpmap:0 PCMU/8000
[9]   a=rtpmap:4 G723/8000
```
Figure 16

```
[1]    v=0
[2]    o=461793 8000 8000 IN IP4 192.168.215.220
[3]    s=SIP Call
[4]    c=IN IP4 192.168.215.220
[5]    t=0 0
[6]    m=audio 5006 RTP/AVP 8
[7]    a=rtpmap:8 PCMA/8000
```

Figure 17

| Media Session Attribute | Expected Value |
|---|---|
| Offering UA IP address | 192.168.215.210 |
| Offering UA destination port | 5004 |
| Answering UA IP address | 192.168.215.220 |
| Answering UA destination port | 5006 |
| Media type | audio |
| Session protocol | RTP/AVP |
| RTP/AVP payload type code | 8 |
| RTP/AVP payload type | PCMA |
| RTP clock rate (1/sec) | 8,000 |
| Number of audio channels | 1 |
| Direction | both |

Figure 18

| Media Session Attribute | Expected Value |
|---|---|
| Network protocol | IP |
| Transport protocol | UDP |
| Exact RTP payload length (bytes) | 160 |
| RTP version | 2 |
| Exact packet arrival rate (packets/sec) | 50 |

Figure 19

METHOD, SYSTEM AND ARCHITECTURE FOR VALIDATING MEDIA SESSIONS IN NETWORKS THAT USE COMMUNICATION PROTOCOLS WITH DISTINCT SIGNALING AND MEDIA CHANNELS

A portion of the disclosure of this patent document contains material which is subject to coyright protection. The coyright owner has no objection to the facsimile reproduction by any-one of the patent document or the patent disclosure, as it appears in the Patent and Trademark Office patent file or records, but otherwise reserves all coyright rights whatsoever.

This application is related to U.S. Pat. No. 7,796,603, issued Sep. 14, 2010, titled "METHOD AND SYSTEM FOR CONTROLLING MEDIA SESSIONS IN NETWORKS THAT USE COMMUNICATION PROTOCOLS WITH DISTINCT SIGNALING AND MEDIA CHANNELS."

Many modern communication systems are based on protocols that use an "out-of-band signaling" mechanism whereby the channel that is used to control the communication (the "signaling" or "control" channel) is distinct from the channel that is used to carry (transport) the actual information of interest (the "bearer" or "media" channel). In these systems, a "signaling protocol" is used to manage (e.g. negotiate, create, maintain and terminate) information exchanges (such as "media sessions") that occur on the media channel. Using the signaling protocol, intelligent communication systems can establish different types of media sessions with a wide range of communication attributes. Illustrative protocols of this type are H.323, MGCP and the Session Initiation Protocol (SIP). FIG. 1 shows the general architecture of a communication system that uses distinct signaling and media channels.

SIP is a signaling protocol that was created and is maintained within the framework of the Internet Engineering Task Force (IETF) standards development process. Currently, the document that defines the SIP standard is IETF "Request for Comments" (RFC) 3261. The primary purpose of SIP is to create, maintain and terminate interactive communication sessions between intelligent systems connected to an Internet Protocol (IP) network. In SIP terminology, these sessions are commonly referred to as "media" sessions.

When a SIP based system wishes to manage (e.g., initiate, modify or destroy) a media session (or sessions) with another SIP based system, it describes the media session(s) of interest using an IETF standard protocol called the Session Description Protocol (SDP). Currently, the document that defines the SDP standard is IETF "Request for Comments" (RFC) 2327. When SIP based systems negotiate media sessions, they embed SDP media descriptions within the SIP signaling messages they exchange. As noted above, the media sessions themselves are independent of the signaling sessions and can take different paths through the network. Using SIP and SDP, intelligent systems are able to set up, maintain and terminate various kinds of media sessions including, for example, real-time text messaging, audio, video, bulk data transfer and interactive application sharing sessions. This enables users of SIP based systems and applications to engage in a wide range of multi-media communication and collaboration activities. The media sessions can use various standard transport protocols including, for example, the Real-time Transport Protocol (RTP, currently specified in IETF RFC 3550) and the Secure Real-time Transport Protocol (SRTP, currently specified in IETF RFC 3711). The architecture of the SIP and SDP protocols will also enable them to support emerging media protocols such as the Message Session Relay Protocol (MSRP, currently an IETF Internet-Draft or "work in progress") in the future.

In today's networking environments, such as those described above, it is desirable to be able to control and validate the media sessions that are set up by the communicating systems, particularly at boundary points in the network. The process of "media control" involves exercising (or attempting to exercise) control over the media sessions that are negotiated by the communicating systems using the signaling protocol, e.g., by enforcing "media control policies" (rules) that would typically allow certain media sessions and disallow others. More specifically, media control is the process by which the controlling organization attempts to enforce media control policies on an SIP-associated media session created by SIP user agents and proxies, typically by operating on the signaling stream that flows between them. A media control system (MCS) of this type is described in commonly-owned, U.S. Pat. No. 7,796,603, titled "METHOD AND SYSTEM FOR CONTROLLING MEDIA SESSIONS IN NETWORKS THAT USE COMMUNICATION PROTOCOLS WITH DISTINCT SIGNALING AND MEDIA CHANNELS." Media control systems such as this provide effective media control in network environments where the user agents are fully compliant with the applicable signaling and media protocols. Where user agents are not guaranteed to be so compliant, however, cooperating non-compliant or malicious user agents could attack and possibly defeat the media control system (i.e. circumvent the media control policies) for example, by signaling for an allowed media session and then (by prior agreement) setting up a media session that would have been otherwise disallowed had it been properly signaled.

The present invention addresses the need to provide techniques to validate SIP-associated media sessions even in the presence of non-compliant or malicious SIP user agents or proxies.

BRIEF SUMMARY OF THE INVENTION

It is an object of the invention to provide enhanced SIP/SDP based networking wherein actual media sessions flowing through the network can be verified to correspond to the media sessions that were negotiated by user agents.

Another object of the present invention is to provide a mechanism that is capable of validating SIP-associated media sessions even in the presence of non-compliant or malicious SIP user agents or proxies. Thus, such non-compliant or malicious entities cannot circumvent media control policies by signaling for an allowed media session and then (e.g., by prior agreement) setting up a media session that would have been otherwise disallowed.

Yet another more general object of the invention is to provide a media "validation" system (MVS) that, in conjunction with a media control system (MCS), verifies that the media sessions actually created by the communicating systems correspond to the sessions that were negotiated using the signaling protocol and allowed by the media control system.

In a representative embodiment, the media validation system provide a validation service for SIP signaling and media endpoints if it has at least passive (e.g., read only) access to all SIP signaling and associated media traffic that flows between the systems within its control domain. In addition, if the media validation system has active (e.g., in-line) access to the SIP signaling streams, it may be co-resident with an in-line media control system. The media control and media validation functions, although independent, may be integrated into a given system or device. If the media validation system also has active (in-line) access to the SIP-associated media streams, it can exercise affirmative control over the media sessions, e.g., by blocking or terminating a media session that does not correspond to the media session that was negotiated in an associated signaling dialog. If the MVS has only passive access to the media streams, it may still exercise indirect control over the media sessions, e.g., by generating an administrative alarm or a signaling event when it detects a media session that does not correspond to the media session that was negotiated in the associated signaling dialog.

The media validation system verifies that the media sessions that are actually set up by the user agents (the "actual media sessions") correspond to the media sessions that were negotiated by the user agents in the associated signaling dialogs (the "expected media sessions"). Preferably, this verification is achieved by the MVS observing the attributes of the actual media sessions and comparing them to the projected attributes of the corresponding expected media sessions. If there is a discrepancy between the expected media session attributes and the actual media session attributes, preferably the MVS takes an administratively-defined action, such as blocking the media session or generating an administrative alert (e.g., a signaling event, a log entry, or the like).

In addition to comparing the projected attributes of the expected media sessions to the observed attributes of the corresponding actual media sessions, preferably the MVS also verifies that the actual media sessions are compliant with the applicable protocol specifications, preferably at one or more (or all) layers of the protocol hierarchy, and further that these sessions do not exhibit any anomalous, unexpected or suspicious behavior.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 1 illustrates a conventional SIP architecture as is known in the prior art;

FIG. 2 illustrates how SIP user agents interact with SIP proxies according to the techniques known in the prior art;

FIG. 3 illustrates a known SDP session description;

FIG. 4 is a look-up table in which media session format attributes can be derived as is known in the art;

FIG. 7 is an illustrative INVITE message containing an SDP offer;

FIG. 8 is an illustrative "200 OK" response message to the INVITE message of FIG. 7;

FIG. 14 illustrates how the signaling and media proxy components interface to the network in the third embodiment of the invention;

FIG. 15 illustrates how the signaling and media proxy components may be supported in separate physical devices;

FIG. 16 is a representative SDP offer from a user agent A;

FIG. 17 is a representative SDP answer from a user agent B;

FIG. 18 is a table summarizing the expected media session attributes derived directly from the SDP message exchanges of FIGS. 12-13;

FIG. 19 is a table summarizing the expected media session attributes derived indirectly from the SDP message exchanges of FIGS. 12-13.

DETAILED DESCRIPTION OF AN ILLUSTRATIVE EMBODIMENT

Figures 5, 6:
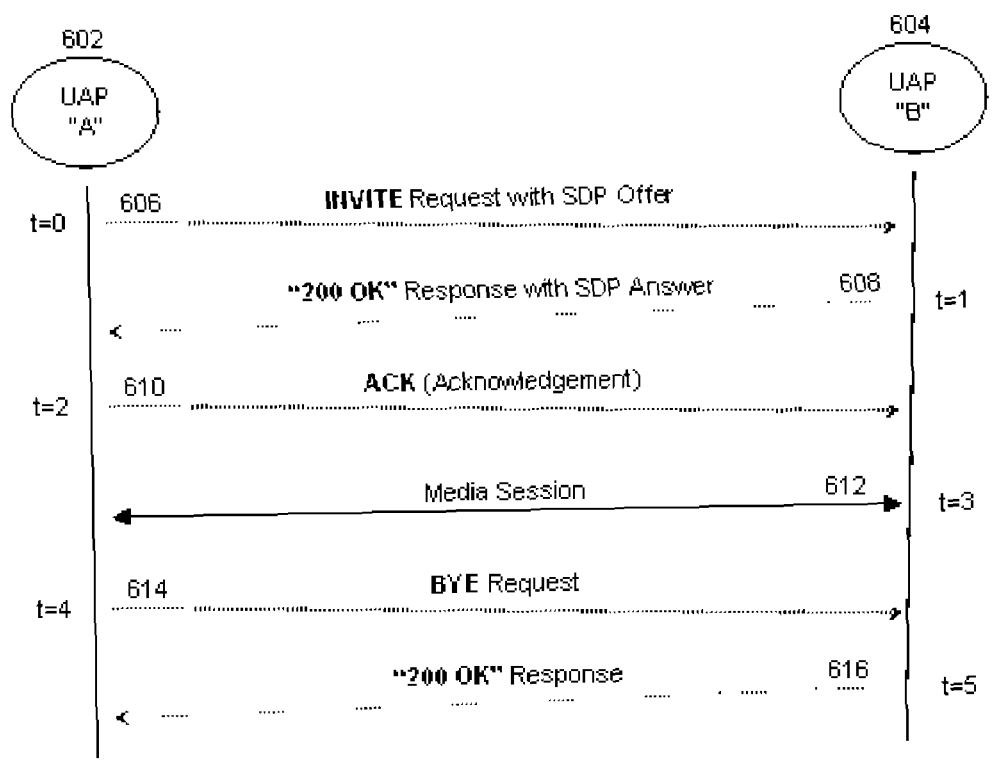
FIG. 5 is an illustrative media session description with media attributes.
FIG. 6 illustrates a typical SIP signaling dialog.

The present invention is described below in the context of the Session Initiation Protocol (SIP), however, this is merely for illustrative purposes. The techniques described below may be implemented in any communication protocol that uses an "out-of-band signaling" mechanism whereby the channel used to control the communication (the "signaling" or "control" channel) is distinct from the channel used to carry the communicated information itself (the "bearer" or "media" channel).

As is well-known, some Internet communication and collaboration applications require the creation and management of one or more sessions, where a media session is a data exchange between given entities. Numerous protocols exist for carrying various forms of real-time multimedia session data such as voice, video, or text messages. The Session Initiation Protocol (SIP) works with these protocols by enabling Internet endpoints (called user agents) to discover one another and to agree on a characterization of a session they would like to share. SIP enables the creation of an infrastructure of network hosts (called proxy servers) to which user agents can send registrations, session invitations, and other requests. SIP creates, modifies, and terminates sessions and works independently of the underlying transport protocols. More specifically, the Session Initiation Protocol (SIP) is an application-layer control protocol that can establish, modify, and terminate multimedia sessions. The basic functions of SIP are: location of an end point, signal of a desire to communicate, negotiation of session parameters to establish a session, and teardown of the session once established. A representative example of a SIP message exchange occurs between two users A and B, each of which has a SIP application on his or her computing device. Each user may be associated with a SIP proxy server that can act on the user's behalf to facilitate the session establishment. According to RFC 3261, a proxy is an intermediary entity that acts as both a server and a client for the purpose of making requests on behalf of other clients. As described in RFC 3261, proxies are also useful for enforcing policy; for example, where the protocol is used to facilitate an Internet telephony call, one such policy would test to determine whether a given user at an Internet endpoint is allowed to make a call. A proxy interprets, and, if necessary, rewrites specific parts of a request message before forwarding it. A SIP request is a SIP message sent from a client to a server for the purpose of invoking a particular operation. A SIP response is a SIP message sent from a server to a client that indicates the status of a request sent from the client to the server. As noted above, a user agent (UA) is a logical entity that can act as both a user agent client and user agent server. A User Agent Client (UAC) is a logical entity that creates a new request, and then uses the client transaction state machinery to send it. A User Agent Server (UAS) is a logical entity that generates a response to a SIP request. The response accepts, rejects, or redirects the request.

SIP-compliant devices communicate using an HTTP-like request/response transaction model. Each transaction consists of a request that invokes a particular method, or function, on the server, and at least one response. For example, a transaction begins with A's device sending an INVITE request addressed to B's SIP identifier. INVITE is an example of a SIP method that specifies the action that the requestor A wants the server B to take. The INVITE request contains a number of header fields, which are named attributes that provide additional information about a message. Thus, for example, an INVITE includes a unique identifier for the call, the destination address, A's address, and information about the type of session that A desires to establish with B. The details of the session, such as the type of media, codec, or sampling rate, are not described using SIP. Rather, the body of a SIP message contains a description of the session, typically encoded in some other protocol format. One such format is the Session Description Protocol (SDP).

The Session Initiation Protocol was designed to enable the "signaling" (control) and "media" (content) traffic to follow completely separate physical paths through a network. In a typical SIP call, the signaling traffic flows from one SIP client (an endpoint) to another SIP endpoint, typically through a series of "signaling proxies" and the media traffic flows from one endpoint to the other endpoint directly. This concept is illustrated in FIG. 2 for a pair of SIP endpoints 200 and 202, and a set of signaling proxies 204 and 206. This approach enables the SIP proxies 204 and 206 to handle a large amount of signaling traffic, as they do not have to handle any associated media traffic.

From a security and control perspective, however, the approach illustrated in FIG. 2 poses serious problems because it leaves the network open to malicious activities that exploit the independence of the signaling and media streams. For example, it is very easy for malicious, cooperating SIP user agents to signal for one kind of media session and then set up a different kind of media session, potentially resulting in unauthorized use of network resources or service theft. In service environments where billing information is derived from signaling activity, malicious user agents could signal the termination of a media session and then, by prior arrangement, allow the media session to continue, resulting in service theft and billing fraud. Malicious user agents could also launch denial-of-service attacks based on resource (e.g. bandwidth) exhaustion by signaling for low bandwidth media sessions and setting up high bandwidth media connections.

By way of additional background, in SIP, media sessions are described using a protocol called the Session Description Protocol (SDP). A typical SDP session description is shown in FIG. 3 below. The line numbers in brackets have been added for reference purposes. For the purposes of the present discussion, the elements of interest in the above session description are lines 4 and 6. Line 4 ("c=IN IP4 192.168.215.210") contains the SDP "connection data." It describes the network level attributes of the media session. Its format is defined as follows:

c=<network type><address type><connection address>.

In this example, the network type is Internet (IN), the address type is Internet Protocol Version 4 (IP4), and the connection address is the IP address 192.168.215.210. Line 6 ("m=audio 5004 RTP/AVP 8 0 4 15") is the SDP "media description" or "media announcement." It describes the media session that is being negotiated. The format for the media description is defined as follows:

m=<media> <port> <transport> <format-list>.

The "media" parameter describes the media type. Defined values for the media parameter are, for example: "audio", "video", "application", "data", "telephone-event" and "control." The "port" parameter is a numerical value indicating a logical transport protocol port for the media session. The "transport" parameter is the media session's transport protocol. Defined values for the transport parameter are, for example: "RTP/AVP", "vat", "rtp", "UDPTL" and "TCP." The "format-list" parameter is a list of numeric media payload type options for the media session. If no additional information regarding the attributes of the listed media payload type options is included in the media description, then the media format attributes can be derived from the numerical payload type value using a static look-up table such as illustrated in FIG. 4. Thus, for example, if an SDP media description includes a reference to a media session with a media format option, for example, of RTP/AVP payload type "8"—without providing additional information that explicitly specifies the attributes of the media format—the media description is referring to a media session with an encoding type of PCMA, a clock rate of 8000 and one (1) audio channel. This is sometimes expressed in shorthand notation as a media format of "PCMA/8000/1" (<encoding type>/<clock rate>/[<audio channels>]).

With regard to the illustrative media description of FIG. 3, then ("m=audio 5004 RTP/AVP 8 0 4 15"), the description is referring to an RTP/AVP audio session with four (4) media format options: PCMA/8000/1 (payload type 8), PCMU/8000/1 (payload type 0), G723/8000/1 (payload type 4) and G728/8000/1 (payload type 15).

In addition to media description statements, SDP messages can include "media attribute" statements that provide additional information about the media session that is being described. For example, session descriptions can include media attributes that reproduce, extend or override the default or "static" media format attributes shown in the table of FIG. 4. A session description with media attributes is shown in FIG. 5. In this example, the media description in line 6 is followed by three media attributes (lines 7, 8, 9) that modify it. Specifically, the media description on line 6 refers to three payload format options using "dynamic" RTP/AVP payload types 96, 97 and 98. The media attribute statements in lines 7-9 define the media formats to be associated with (or "mapped to") those payload types. For example, the media attribute on line 7 maps RTP/AVP payload type 96 to a media format with an encoding name of "G726-16", a clock rate of 8000 and one audio channel.

As is well-known, SIP user agents negotiate media sessions using a technique known as the "SDP offer/answer mechanism." Using this technique, one SIP user agent proposes a media session (or sessions) to another user agent by embedding an "SDP offer" into an SIP signaling message. The SDP offer contains a set of proposed media connections. When a user agent receives an SDP offer, it responds by sending an SIP signaling message with an embedded "SDP answer" back to the offering user agent. The SDP answer indicates which of the proposed media sessions, if any, the receiving user agent is willing to accept.

User agents negotiate media sessions in the context of "signaling dialogs." A signaling dialog is a series of related "transactions" made up of "request" and "response" messages that flow between the user agents. SDP offers can be embedded in several different kinds of SIP request and response messages, including, for example, INVITE requests, "200 OK" responses and UPDATE requests. SDP answers can also be embedded in several different kinds of SIP messages including, for example, "200 OK" responses and ACK requests. User agents can negotiate media sessions multiple times within a given signaling dialog.

A typical SIP signaling dialog is shown in FIG. 6. In this case, UAP A 602 sends a SIP INVITE request containing an SDP offer to UAP B 604 at time t=0. This is step 606. The format for a typical INVITE message is shown in FIG. 7. The INVITE message shown in FIG. 7 contains an SIP Request-Line (line 1) and a set of SIP headers (lines 2 through 12). The body of the message contains an SDP session description (lines 14 through 24). The SDP session description contains a "media description" (line 19) and a set of "media attributes" (lines 20 through 24) that apply to the media description. The SIP INVITE message and its embedded SDP session description constitute an "SDP offer." In this case, UAP A is offering UAP B an audio session with a choice of five payload type (codec) options.

UAP B responds by sending a SIP "200 OK" response message containing an SDP answer to UAP A at time t=1. This is step 608 in the process flow of FIG. 6. FIG. 8 illustrates a typical response message format. The body of the 200 OK response message of FIG. 8 contains an SDP session description (lines 13 through 19). The session description contains a media description (line 18) with a single media attribute (line 19). The response message constitutes an "SDP answer." In this case, UAP B has accepted UAP A's proposed audio connection and selected audio/video profile 8 (PCMA/8000) as the media payload type option.

At time=2, UAP A acknowledges receipt of UAP B's answer by sending an ACK message. This is step 610 in FIG. 6. The two user agents then set up the agreed media session at time t=3. This is step 612 in FIG. 6. If the user agents are "well behaved," the media session that they set up should correspond to the media session that they negotiated (a PCMA/8000 audio session in this example); the user agents then begin exchanging media packets.

At time t=4, step 614 in FIG. 6, UAP A terminates the session with an SIP BYE request. At time t=5, step 616, UAP B responds to the BYE with a "200 OK" response. If the user agents as well behaved, the media session that they set up should now be shut down, and no additional media packets should flow.

Figure 9:
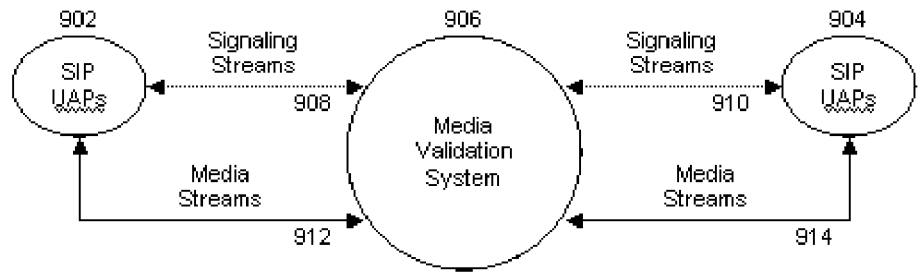
FIG. 9 illustrates a first embodiment of the present invention, wherein a media validation system (MVS) is located in-line with both the signaling and media stream paths between a given pair of user agents.
Figure 10:
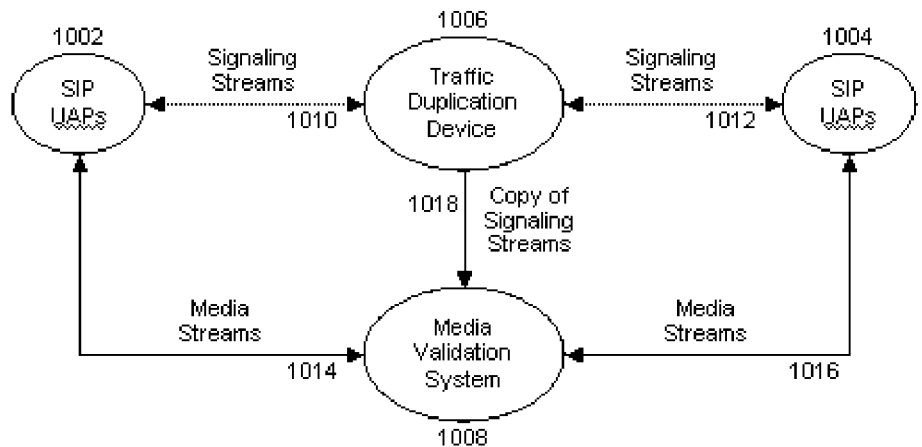
FIG. 10 illustrates a second embodiment of the invention wherein the MVS is located in-line with the media streams but has only passive access to the signaling streams.
Figure 11:
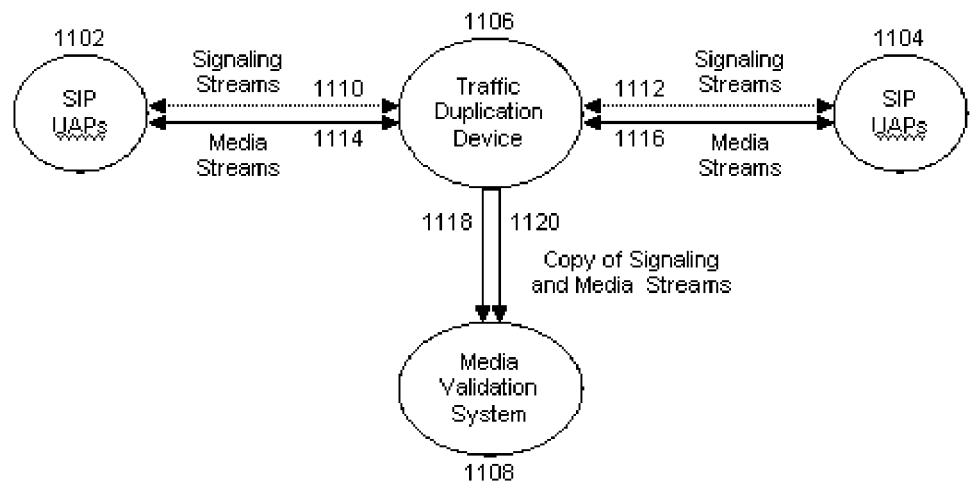
FIG. 11 illustrates a third embodiment of the invention wherein the MVS is deployed with only passive access to both the signaling and media streams.

The above discussion gives a simple example of two SIP user agents negotiating a media session. Many other scenarios are possible, but the fundamental offer/answer mechanism is the same for all SIP media negotiations. The above example will now be used to illustrate how the inventive media validation system (MVS) validates a media session. According to the present invention, in one embodiment the MVS may be positioned in-line with both the signaling and media streams as illustrated in FIG. 9. In this embodiment, MVS 906 is positioned between UAPs 902 and 904, and MVS has in-line access to signaling streams 908 and 910, as well as media streams 912 and 914. Alternatively, as illustrated in FIG. 10, the MVS 1008 is positioned in association with UAP 1002 and 1004 but is only in-line with the media streams 1014 and 1016. In this case, the MVS 1008 has only passive access to the signaling streams 1010 and 1012, and a traffic duplication device 1006 is positioned between UAPs 1002 and 1004. The traffic duplication device is a device that receives the signaling streams 1010 and 1012 and copies these streams to the MVS via communication link 1018. In yet another embodiment, as illustrated in FIG. 11, the MVS 1108 is deployed with only passive access to both the signaling and media streams. In this case, the traffic duplication device 1106 provides a copy of the signaling and media streams over the communication link 1114. UAPs 1102 and 1104 transfer media streams 1110 and 1112 through the traffic duplication device. In this case, the MVS exercises only indirect control over the media sessions.

Figure 12:
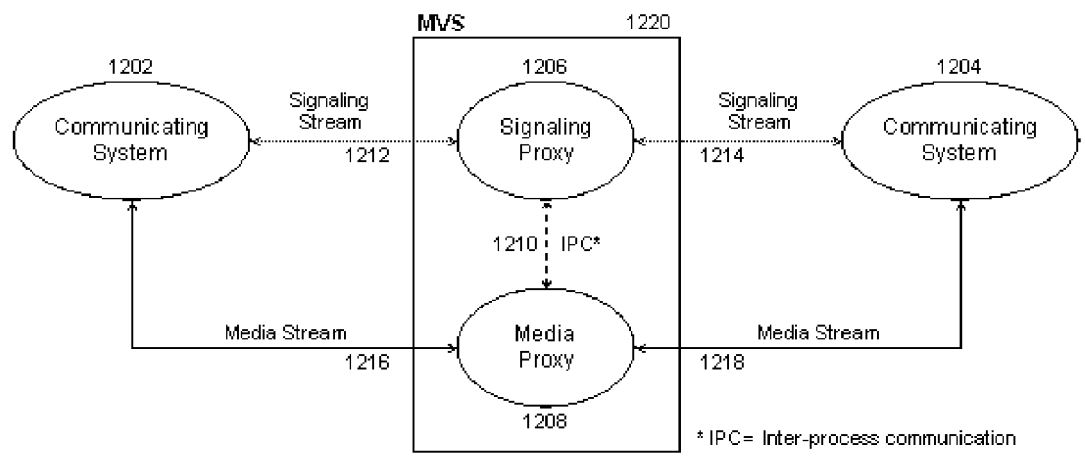
FIG. 12 illustrates the first embodiment of the invention in more detail, showing the signaling and media proxy components of the MVS.

Conceptually, the MVS preferably comprises two functional components: a signaling component and a media component. The signaling component monitors the signaling stream, and it parses and interprets the applicable signaling protocols (such as SIP and SDP, for example). The signaling component also stores information regarding the state of the signaling dialogs that traverse it. The media component monitors and analyzes the media streams, and it interprets the various media protocols (such as 802.x, IP, UDP and RTP, for example). The media component also stores information regarding the state of the media sessions that traverse the component. The signaling and media components communicate, notify each other of events, and share session state information, preferably using inter-process communication (IPC). In the case where the MVS is in-line with both the signaling and media streams (as described above with respect to FIG. 9), the MVS components interface to the network as illustrated in FIG. 12. In this example, systems 1202 and 1204 are desire to establish a SIP exchange using the signaling streams 1212 and 1214, and the media streams 1216 and 1218. The MVS 1220 comprises the signaling component 1206 and the media component 1208. The signaling component 1206 is a "signaling proxy" and the media component is a "media proxy," as shown in FIG. 12. These proxies communicate over IPC 1210.

Figure 13:
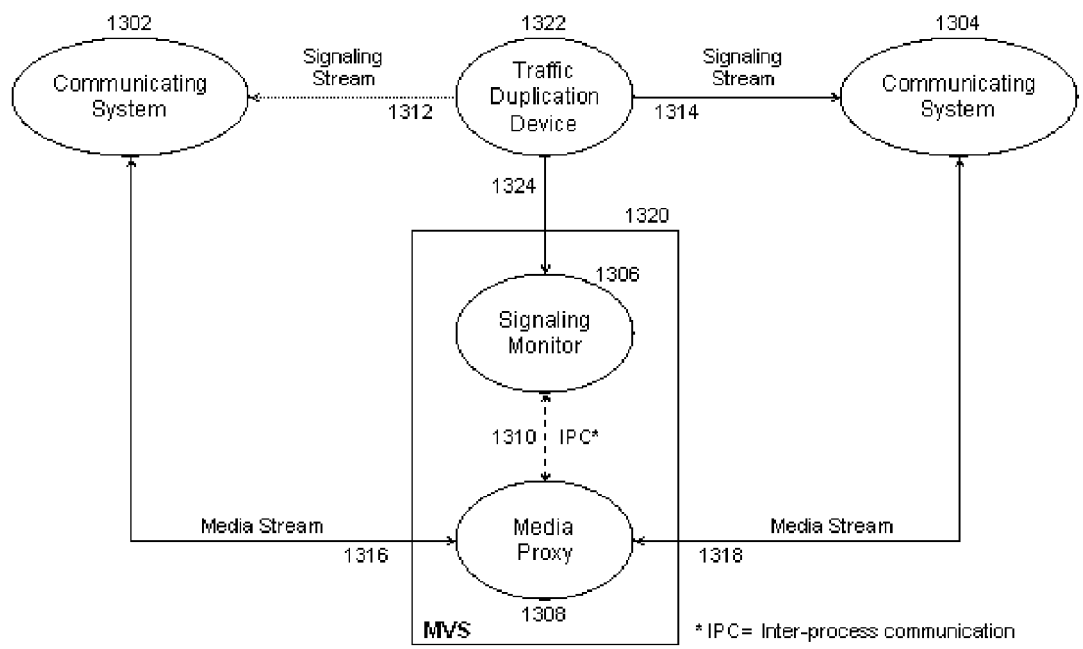
FIG. 13 illustrates how the signaling and media proxy components interface to the network in the second embodiment of the invention.

FIG. 13 illustrates how MVS components are employed in cases where the MVS has passive (read-only) access to the signaling stream but active (in-line) access to the media stream. This embodiment corresponds to that shown in FIG. 10 above. In particular, a traffic duplication device 1322 is positioned between communicating systems 1302 and 1304 to receive and transmit the signaling streams 1312 and 1314. The traffic duplication device 1322 provides the signaling stream copy to the signaling monitor 1306 of the MVS 1320, and the media proxy 1308 of the MVS is located in-line with the media streams 1316 and 1318, substantially as shown. The monitor 1306 and the media proxy 1308 communicate over IPC 1310.

FIG. 14 illustrates how the MVS components are employed in cases where the MVS has only passive (read-only) access to both the signaling and media streams. This embodiment corresponds to that shown in FIG. 11 above. In this a traffic duplication device 1422 is positioned between communicating systems 1402 and 1404 to receive and transmit the signaling streams 1412 and 1414, as well as the media streams 1416 and 1418. The traffic duplication device 1422 provides the signaling stream copy to the signaling monitor 1406 of the MVS 1420 via the communication link 1424, and it provides the media stream copy to the media proxy 1408 of the MVS via the link 1426. The monitor 1406 and the media proxy communicate over IPC 1410.

In any of the above-described deployment examples of FIGS. 12-14, the signaling and media components of the MVS can be resident in separate physical devices, provided IPC (or equivalent) is available over the network connection. An example of such a distributed deployment is shown in FIG. 15. In this example, which is otherwise similar to that of FIG. 14, the signaling 1506 and media 1508 components of the MVS 1520 are housed in separate physical devices.

With the above as background, the following describes how the MVS can be used to validate a media session according to the present invention.

Assume that SIP user agent A wants to set up a media session with SIP user agent B. User agent A sends user agent B an SDP offer, such as the offer shown in FIG. 16. As can be seen, user agent A if offering user agent B an audio session with three payload type options (PCMA, PCMU, G723). In this example, user agent B responds by responds by sending user agent A an SDP answer, such as the answer shown in FIG. 17. As can be seen, user agent B has accepted user agent A's offer and selected the PCMA payload type option. At this point, the user agents are able to set up the negotiated media session. The MVS verifies that the actual media session set up by the user agents is consistent with the media session that was negotiated. In particular, preferably the MVS accomplishes this task by deriving one or more attributes of the expected media session directly from the information contained in the SDP exchange. For example, given the SDP exchange of FIGS. 16-17 by way of example only, MVS (e.g., MVS 906 in FIG. 9, MVS 1008 in FIG. 10, MVS 1108 in FIG. 11, as the case may be) derives the following attributes: the expected Internet Protocol (IP) source address of the offering user agent (user agent A) is 192.168.215.210; the IP destination port of the offering user agent (user agent A) is 5004; the IP source address of the answering user agent (user agent B) is 192.168.215.220; the IP destination port of the answering user agent (user agent B) is 5006; the media type is audio; the session protocol is RTP/AVP (Real-time Transport Protocol with Audio/Video Profile); the RTP/AVP payload type code is 8; the RTP/AVP payload type is PCMA (Pulse Code Modulation with A-law scaling); the RTP clock rate is 8,000 per second; the number of audio channels is 1; the direction is both (bidirectional). This information is summarized in the table of FIG. 18. It should be noted that the particular set of attributes mentioned here is based on the SDP exchange in FIGS. 16-17 and is for illustrative purposes only.

The MVS also infers several other attributes of the expected media session indirectly from the information contained in the SDP exchange, based on its understanding of the underlying protocol semantics. Thus, for example, given the SDP exchange of FIGS. 17-18, the following additional information (which is merely representative) is obtained: the network protocol is IP (Internet Protocol); the transport protocol is UDP (Universal Datagram Protocol); the RTP payload length is 160 bytes; the RTP version is 2; the packet arrival rate is 50 packets per second. This additional information is summarized in the table illustrated in FIG. 19. As above, the particular set of attributes mentioned here is merely illustrative, as it is based on the SDP exchange of FIGS. 16-17. Of course, additional attributes are possible in other cases.

The set of expected media session attributes may be different for different media sessions. For example, in the case of a proposed media session that uses a payload type that allows a variable length payload, it may not be possible to project an exact RTP payload length, but it may be possible to project an RTP payload length range. In this case, the "exact RTP payload length" attribute would not be included in the set of projected attributes but an "RTP payload length range" attribute would be included. Similarly, for payload types that support variable packet rates, it may not be possible to project an "exact packet arrival rate" attribute, but it may be possible to project a "maximum packet arrival rate" attribute.

When the user agents set up the negotiated media session, the MVS observes the attributes of the actual media session and compares them to the expected attributes. If the MVS finds any discrepancy between the actual and expected values, it takes a given action. In a representative embodiment, the given action is an administratively defined action, e.g., terminating the media session; dropping the media session's packets, generating an alert, alarm, event or log entry, or the like. These are merely representative.

In addition to comparing the actual and expected attributes of the media sessions, the MVS preferably performs other types of media validation. The MVS can observe the Media Access Control (MAC) addresses of the user agents at the beginning of the media session and ensure that those MAC addresses do not change during the media session. This prevents various forms of "media hijacking" and "media injection" attacks whereby a malicious user agent attempts to disrupt a media session by, for example, assuming ("spoofing") the IP address of a legitimate user agent and injecting packets into the media stream. As another example, the MVS can ensure that the media stream is fully compliant with the applicable protocols by performing protocol compliance checks at every layer of the protocol hierarchy (e.g. IEEE 802.x, IP, UDP, RTP). This function involves, for example, performing packet header compliance, consistency and integrity checks at each level of the protocol stack. A validation function of this type provides a multi-level verification that the actual media stream is consistent with the negotiated media stream. As another example, the MVS can ensure that the media stream does not display any protocol-specific anomalies at any layer of the protocol hierarchy. For RTP, for example, the MVS can ensure that the RTP sequence numbers, timestamps and synchronization source (SSRC) and contributing source (CSRC) identifiers make sense within the context of the media session. This prevents a variety of media injection attacks. Another validation function is having the MVS positively verify that the media information carried in the payload of the RTP packet corresponds to the negotiated payload type, e.g., by feeding a copy of the RTP media stream to a media codec or digital signal processor that is capable of detecting RTP payload types automatically and comparing the detected payload type to the expected payload type. The MVS can also ensure that the duration of the media session does not extend beyond the temporal boundaries of the signaling dialog. This prevents the flow of unauthorized or fraudulent media information. As another validation function, the MVS monitors the quality of the actual media session using a variety of "quality of service" (QOS) metrics such as packet jitter (variability of delay), out-of-sequence packets, lost packets, duplicate packets, corrupted packets, and the like. This enables the MVS to ensure that the actual quality of the media session corresponds to the expected quality of the media session. A large discrepancy between actual and expected quality of service could be indicative of network congestion or malicious activity.

The present invention has numerous advantages over the prior art. The MVS operates to ensure that actual media sessions flowing through the network can be verified to correspond to the media sessions that were negotiated by user agents. Thus, the invention provides a mechanism that is capable of validating SIP-associated media sessions even in the presence of non-compliant or malicious SIP user agents or proxies. The MVS addresses and solves the security problems caused by non-compliant or malicious entities circumventing media control policies, e.g., by signaling for an allowed media session and then setting up a media session that would have been otherwise disallowed. The MVS, when used in conjunction with a policy-based media control system (MCS), verifies that the media sessions actually created by the communicating systems correspond to the sessions that were negotiated using the signaling protocol and allowed by the media control system.

As has been described, the media validation system advantageously provides a validation service for SIP signaling and media endpoints if it has at least passive (e.g., read only) access to all SIP signaling and associated media traffic that flows between the systems within its control domain. Where the media validation system has active (e.g., in-line) access to the SIP signaling streams, it may be co-resident with an in-line media control system. If the media validation system also has active (in-line) access to the SIP-associated media streams, it can exercise affirmative control over the media sessions, e.g., by blocking or terminating a media session that does not correspond to the media session that was negotiated in an associated signaling dialog. Indeed, even if the MVS has only passive access to the media streams, it may still exercise indirect control over the media sessions, e.g., by generating an administrative alarm or a signaling event when it detects a media session that does not correspond to the media session that was negotiated in the associated signaling dialog.

In operation, the media validation system verifies that the media sessions that are actually set up by the user agents (the "actual media sessions") correspond to the media sessions that were negotiated by the user agents in the associated signaling dialogs (the "expected media sessions"). As has been described, this verification is achieved by the MVS observing the attributes of the actual media sessions and comparing them to the projected attributes of the corresponding expected media sessions. If there is a discrepancy between the expected media session attributes and the actual media session attributes, the MVS advantageously takes an administratively-defined action, such as blocking the media session or generating an administrative alert (e.g., a signaling event, a log entry, or the like). In addition to comparing the projected attributes of the expected media sessions to the observed attributes of the corresponding actual media sessions, The MVS may also verifies that the actual media sessions are compliant with the applicable protocol specifications, preferably at one or more (or all) layers of the protocol hierarchy, and further that these sessions do not exhibit any anomalous, unexpected or suspicious behavior.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs on a server on a standard Intel hardware platform running an operating system such as Linux.

While given components of the system have been described separately, one of ordinary skill will appreciate that some of the functions may be combined or shared in given instructions, program sequences, code portions, and the like.

Although protocols like SIP and SDP evolve over time and the governing standards documents that define them are updated from time to time, such evolution and updating are not material to the present invention. One of ordinary skill in the art will appreciate that the present invention is based on the fundamental principles of the SIP and SDP protocols, and is not dependent on any particular version of the relevant standards documents.

Finally, the techniques of the present invention, wherein a media validation system monitors actual media sessions to determine their compliance with expected media session attributes, is not limited to SIP, or SIP as implemented using SDP.

Having described our invention, what we claim is as follows:

1. A machine-implemented method operative in or in association with a signaling path between given entities that are attempting to set up a media session via transfer of signaling messages that conform to the Session Description Protocol (SDP), wherein the given entities are compliant with the Session Initiation Protocol (SIP), comprising:
    deriving, from the signaling messages, a negotiated set of one or more negotiated attributes of an expected media session negotiated by the given entities;
    inferring, from the signaling messages and from semantics of another protocol underlying the SIP, an inferred set of one or more non-negotiated attributes of the expected media session;
    during the actual media session, determining whether the negotiated set and the inferred set of one or more non-negotiated attributes correspond to given attributes of the actual media session negotiated by the given entities; and
    if the negotiated set and the inferred set of one or more non-negotiated attributes do not correspond to given attributes of the actual media session, taking an administratively-defined action.

2. The method as described in claim 1 further including the steps of:
    determining whether the actual media session is compliant with requirements of one or more layers of a given communications protocol; and
    taking a given action if the actual media session is not compliant with requirements of one or more layers of the given communications protocol.

3. The method as described in claim 1 further including the steps of:
    determining whether the actual media session exhibits a given expected behavior; and
    taking a given action if the actual media session does not exhibit the given expected behavior.

4. A machine-implemented method operative in or in association with a signaling path between given entities that are attempting to set up an information exchange via transfer of signaling messages along a signaling path, the signaling messages conforming to a session initiation protocol, wherein the session initiation is based on Internet Engineering Task Force Request for Comments 3261, the method comprising:

parsing the signaling messages to obtain signaling state information for one or more signaling dialogs between the given entities;

analyzing a media channel used to carry the information exchange;

parsing media streams carried by the media channel to obtain media state information for one or more media sessions that have been established by the given entities;

based on the signaling state information and the media state information, determining whether a non-address attribute of an actual media session corresponds to a corresponding non-address attribute of an expected media session negotiated by the given entities, wherein the determining further comprises inferring, from the signaling messages and semantics of another protocol underlying the session initiation protocol, an inferred set of one or more non-negotiated attributes of one or more of the established media sessions; and if the non-address attribute of the actual media session does not correspond to the corresponding non-address attribute of expected media session as negotiated by the given entities, taking an action associated with the non-correspondence, wherein the action is defined by a system administrator.

5. The method as described in claim 4, wherein the action comprises blocking or terminating the actual media session.

6. The method as described in claim 4, further comprising determining whether the actual media session is compliant with requirements of a plurality of protocol layers, and the taking comprises taking the action if the actual media session is not compliant with the requirements of the plurality of protocol layers.

7. The method as described in claim 4 further including the steps of:

determining whether the actual media session exhibits a given expected behavior; and taking a given action if the actual media session does not exhibit the given expected behavior.

8. A machine-implemented method operative in or in association with a signaling path between given entities that are attempting to set up a media session via transfer of signaling messages that conform to the Session Description Protocol (SDP), wherein the given entities are compliant with the Session Initiation Protocol (SIP), comprising:

deriving, from the signaling messages, a non-address projected attribute of an expected media session negotiated by the given entities, the projected attribute describing an attribute other than an address;

inferring, from the signaling messages and from semantics of another protocol underlying the SIP, a non-address inferred attribute, the inferred attribute describing an attribute other than an address;

during the actual media session, determining whether the non-address projected attribute and the non-address inferred attribute correspond to corresponding attributes of the actual media session negotiated by the given entities; and if the non-address projected attribute and the non-address inferred attribute do not correspond to the corresponding attributes of the actual media session negotiated by the given entities, taking a given administratively-defined action.

9. The method as described in claim 8, wherein the given administratively-defined action comprises blocking the actual media session.

10. The method as described in claim 8, wherein the given administratively-defined action comprises terminating the actual media session.

11. The method as described in claim 8, wherein the given administratively-defined action comprises generating an administrative alert.

12. The method as described in claim 8, further comprising:

determining whether the actual media session is compliant with requirements of a plurality of protocol layers;

taking a given action if the actual media session is not compliant with the requirements of the plurality of protocol layers.

13. The method as described in claim 8 further comprising:

determining whether the actual media session exhibits a given expected behavior; and taking a given action if the actual media session does not exhibit the given expected behavior.

\* \* \* \* \*